Nov. 9, 1954
L. C. DANDURAND ET AL
2,693,838
ANTISKID DEVICE
Filed Jan. 19, 1950
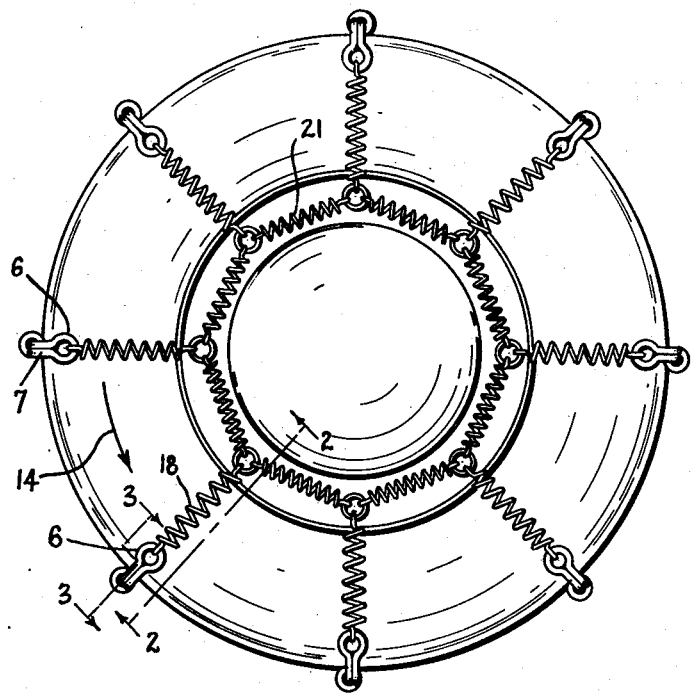
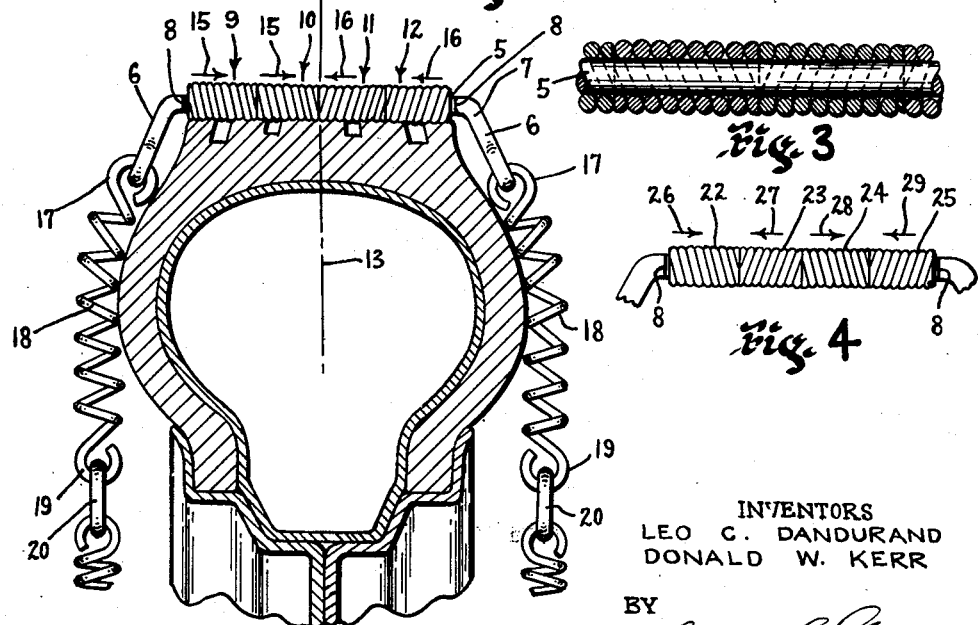
INVENTORS
LEO C. DANDURAND
DONALD W. KERR
BY
*Louis L. Gagnon*
ATTORNEY United States Patent Office 2,693,838
Patented Nov. 9, 1954

2,693,838

ANTISKID DEVICE

Leo C. Dandurand, Southbridge, and
Donald W. Kerr, Boston, Mass.

Application January 19, 1950, Serial No. 139,498

1 Claim. (Cl. 152—225)

This invention relates to an anti-skid device for use on the tires of motor vehicles or the like and has particular reference to a novel method of making the same.

One of the principal objects of the invention is to provide an anti-skidding device adapted to be applied to the tires of a motor vehicle or the like and method of making the same whereby the anti-skidding portions of said device will function with extremely high efficiency under all prevailing conditions of use, will have greatly increased resistance to wear and little, if any, effect upon the riding qualities of the vehicle at normal speeds of travel.

Another object is to provide a novel arrangement and method of connecting and supporting anti-skidding devices of the above character on tires.

Another object is to provide anti-skid means of the above character each embodying a rigid bar-like member having opposingly wound coil spring-like sections thereon for aiding in introducing the anti-skidding action and which, through contact thereof with a hard surface such, for example, an ice-glazed road surface or the like, are adapted to frictionally rotate on said bar to present new areas thereof to wear and with the tendency thereof to move laterally on the bar during said rotation being counteracted by the opposing action of said respective sections to said movement.

Another object is to provide a device of the above character having anti-skid portions embodying bar-like members of a length substantially equal to that of the width of the tread of the tire with which said device is to be used and having looped end portions angled in a sidewise direction toward the center of the tire and to which means may be secured for supporting and retaining said anti-skid portions in operative position of use, said bar-like members having a plurality of sections embodying closely related helically wound convolutions of wire simulating coil spring sections fitting in relatively intimate rotating relation with the bar-like member, with the said ends of said respective sections in engaging relation with each other and the outer ends of the sections in substantially abutting relation with the free ends of the looped portions to retain said sections against sidewise movement relative to each other on said bar member, and further having the angle of said convolutions of said sections oppositely disposed with respect to each other whereby, during rotation of said sections on said bar member and due to the helical oppositely wound convolutions thereof, the tendency of one section to move longitudinally of the bar in one direction will be opposed by the tendency of the adjacent section to move in the opposite direction on said bar.

Another object is to provide spring-like sections of the above character arranged in pairs having the angle of the coils of one pair disposed in opposing directions with respect to the other pair and normally being such as to have an initial resilient gripping action with the bar on which they are mounted whereby any threading action in a sidewise direction with respect to said bar during the use of the device will be opposed by the other adjacent sections whereby said sidewise threading actions will be substantially neutralized and yet permit said sections to jointly perform their anti-skidding function with the rotary movement thereof on the bar introducing new bearing surfaces or wearing areas whereby the overall life of the device is greatly increased.

Another object is to provide a supporting structure for said anti-skidding portions embodying a plurality of radially disposed coil springs having one end thereof attached to the respective loops of the bar-like members and having their opposed ends secured to ring-like means which join a plurality of circularly arranged coil springs.

Other objects and advantages of the invention will become apparent from the following description taken in connection with the accompanying drawings and it will be apparent that many changes may be made in the details of construction, arrangement of parts and method shown and described without departing from the spirit of the invention as expressed in the accompanying claims.

We, therefore, do not wish to be limited to the exact details and method shown and described as the preferred forms only have been given by way of illustration.

It is commonly known that there has been suggested many different types of anti-skidding devices for use with the tires of motor driven vehicles. Among these, it is further known that some suggested the use of relatively continuous coil-spring type anti-skidding means loosely mounted on flexible cross members, but as far as is known, of the various different types of anti-skidding devices which have come into commercial use, those of the type embodying chain sections have become most prevalent.

There are several factors controlling such anti-skidding devices, such as their ability to meet the standards established by laws pertaining to highways, their ability to perform their intended function under all different prevailing conditions, their all around utility, their resistance to wear and their ultimate effect upon the riding qualities of the vehicle on which they are used.

All of these factors have been taken into careful consideration in arriving at the present invention and have been obtained in a simple, efficient and inexpensive manner. The resultant device occupies a position which one might term outstanding in a field which has been extremely well worked.

It is known that most prior art devices have proven to be impractical for one reason or another and that under present day conditions, chain-type anti-skidding devices have received most widespread acceptance. It is commonly known, however, that chains wear quite quickly, they have a decided effect upon the riding qualities of a vehicle, are obnoxiously noisy and fail to perform their intended function under different prevailing conditions such, for example, as on hard ice-glazed surfaces.

The present invention is one which overcomes all prior art difficulties and accomplishes results heretofore not obtainable particularly with chain-type anti-skidding devices, it is one which has substantially little effect upon the riding qualities of the vehicle, it obviates obnoxious noises and introduces extremely efficient anti-skidding functions under all prevailing conditions of use.

Referring to the drawings:

Fig. 1 is a side elevational view of the device embodying the invention in position of use on a tire;

Fig. 2 is a greatly enlarged sectional view taken as on line 2—2 of Fig. 1 and looking in the direction indicated by the arrows;

Fig. 3 is an enlarged fragmentary sectional view of a bar member having helically wound sections thereon and looking in the direction indicated by the arrows 3—3 in Fig. 1; and Fig. 4 is a fragmentary view of a slight modified form of the anti-skid portion of the invention.

Referring to the drawings wherein like characters of reference designate like parts throughout the several views, the device comprises bar members 5 formed of relatively stiff metal of circular cross section having their respective ends 6 formed to the shape of loops which are deflected in a sidewise direction toward the center of the tire, as shown best in Fig. 2. The free end portions of the looped portions 6, as illustrated at 7, are shaped to lie in adjacent relation with the internally deflected portions of the loops 6 and each have a free end portion 8 disposed in a plane substantially normal to the longitudinal axis of the respective bar members.

The bar members, intermediate their sidewise deflected end looped portions 6, are of a length controlled according to the width of the tread of the tire with which the device is to be used.

On said bar members, intermediate the ends 8, there is provided a plurality of closely helically wound sections of wire simulating coil springs which, as shown in Fig. 2, comprise a plurality of abutting sections 9, 10, 11 and 12. It is particularly pointed out that the abutting ends of each of said respective sections lie in a plane substantially normal to the longitudinal axis of the bar member and the outer ends of the outermost sections 9 and 12 are adjacent to and substantially parallel with the end surfaces 8 of the looped portions.

It is further pointed out that the said sections are so controlled as to size of windings as to have a relatively intimate resilient fit with the bar member 5, as shown best in Fig. 3. As shown in Figs. 2 and 3, the said sections are arranged in pairs 9 and 10 having their convolutions angled outwardly in a sidewise direction with respect to the medial plane 13 of the tire or wheel and the sections 11 and 12 have their convolutions angled inwardly or in a direction opposite to the convolution of the sections 9 and 10 with respect to the medial plane 13. The direction of angling is controlled in part upon the intended major direction of rotation of the wheel such as during the normal forward movement of the vehicle. For example, if the major rotation of the wheel is to be in a direction indicated by the arrow 14, the convolutions would be arranged in opposing relation with each other, as shown in Fig. 2 so that rotation of said sections on the bar member 5 will tend to cause the respective sections to move inwardly in the directions indicated by the arrows 15 and 16 whereby the said sections would oppose each other and retain their desired position on the bar member, that is, the movement of one set of sections will be opposed by the other set of sections in this respect.

The sections, as stated above, have an intimate resilient fit with the bar member so that the rotation thereof on said bar member is simultaneously resisted by said gripping action with a view to preventing too free a rotation of said sections during the use of the device. The convolutions of the sections are intended, when driving on a relatively hard icy surface, to cut into said icy surface and provide angled thread-like gripping means for aiding in preventing forward and sidewise skidding. The tendency of the sections to rotate on the bar member presents new bearing or wearing areas during said above function thereby greatly increasing the life and durability of the device. The said sections and bar member, when driving in snow, function cooperatively to introduce the desired gripping tread. The size of the bars and the size of the respective sections are such as to introduce maximum efficiency in the above respect while having little, if any, noticeable effect on the riding qualities of the vehicle. It has been found that when the vehicle obtains a speed of approximately fifteen miles an hour or over, there is substantially no noticeable effect upon the riding qualities of the vehicle or the creation of obnoxious noises even on hard surfaces.

Substantially no distortion of the sections takes place during the use of the device because of their intimate fit with the bar and their tendency to oppose each other as to lateral movement on the bar member during the use of the device. This lateral movement is further opposed by the free ends 8 of the looped portions which function as bearing means for retaining the sections in proper position on the bar.

The said sections are preferably formed of a relatively heavy metal wire which may be hardened and tempered to increase wear resistance. The bar members are also formed of a metal which may be hardened to resist wear if desired.

The looped sidewise deflected ends of the bars will afford means to which the adjacent ends 17 of radially disposed coil springs 18 may be attached. The opposed ends 19 of the coil springs are attached to rings 20 to which circularly related coil springs 21 are attached in a manner similar to the radially disposed springs 18. The looped end of one of said coil springs 21 is so formed as to permit the latching and unlatching thereof with one of said rings 20 to facilitate the attaching and detaching of the device from the wheel of the vehicle.

Although there has been described the provision of a plurality of radially disposed springs 18 and circularly disposed springs 21 functioning as means for retaining the anti-skidding members in desired position of use, it is to be understood that anti-skidding devices made in accordance with the present invention may be held in proper relation with the tire by other suitable attachment means. The present means, however, has proven to be very satisfactory and is the preferable arrangement desired.

It is further pointed out that any number of anti-skidding devices may be used throughout the contour of the tire, that is, they may be positioned relatively close to each other or staggered in a manner shown in Fig. 1.

While it has been described that the convolutions of the sections 9 and 10 and the sections 11 and 12 have been positioned in pairs in oppositely angled relation with each other in order to act in opposition to each other as to lateral movement which might tend to take place on the bar members 5, the said sections may be arranged as illustrated in Fig. 4 wherein a section 22 is oppositely angled with respect to its adjacent section 23 and the section 24 is oppositely angled to said section 23 and to said section 25. The opposing forces tending to resist lateral movement of said sections relative to the bar member, are illustrated by the respective arrows 26, 27, 28 and 29. It is to be understood that the ends 8 form bearing means for retaining the respective outer sections 22 and 25 in desired position on the bar.

It is further to be understood that the respective sections may be altered as to their overall related length and the number of sections used on any one bar member may be varied as desired according to the size of the tire with which the anti-skidding device is to be used.

The bar members are formed to resist bending during use and the initial size thereof and the size of the sections is dependent upon the type of vehicle with which they are to be used. It is quite obvious that anti-skidding devices of this nature which are to be used with relatively large heavy vehicles would be made proportionately larger than that of a pleasure vehicle.

The cushioning action of the tire plus the function of the radial springs and the circularly related springs is such as to permit the bar members to maintain a substantially parallel relation with the surface of the tire engaged by the coil spring-like sections thereby greatly preventing any tendency of the bar members to become bent or distorted during use. The fact that the spring-like sections are intimately related with the bar member and have a yielding gripping action with the bar, substantially no distortion thereof will take place during the use of the device and the opposing relation of the convolutions together with the abutting thereof with the end surfaces 8 of the looped portions tends to prevent any opening out of the convolutions with respect to each other. The fact that the convolutions have a tendency to rotate on the bar during the use of the device continuously presents new bearing surfaces and thereby greatly resists the wear of said spring sections and will greatly prolong the life of the device. Actual road tests have been made of the present invention and they have been found to outlast any of the commercially known anti-skidding devices, they meet all of the requirements as to road laws pertaining to such anti-skidding devices, they have no tendency to mar or injure the road surface and function very efficiently under all desired conditions of use. The device further is relatively simple in its construction and inexpensive.

It is to be understood that the various bar members may be shaped prior to hardening for ease of fabrication and that the coil spring-type sections may be formed of initially annealed material which, after being shaped as desired, may be hardened and tempered by conventional processes.

From the foregoing description, it will be seen that simple, efficient and economical means and method have been provided for accomplishing all of the objects and advantages of the invention.

Having described our invention, we claim:

An anti-skidding device for use with the tread of the tire of a vehicle comprising a relatively rigid bar member of a length sufficient to extend transversely of the width of the tread and having looped portions adjacent the opposed ends thereof with the free ends of the looped portions having inwardly disposed flat end surfaces facing each other and located in a plane substantially normal to the longitudinal axis of the bar member, a plurality of coil spring-like members having a frictional gripping action with and arranged in groups on said bar member with the angle of the convolutions of the respective groups being so controlled that the spring-like members adjacent the opposite ends of the bar member are positioned in opposing relation to each other, said coil spring-like members being arranged with the ends thereof in substantially abutting relation with each other and with the outer ends of the outermost coil spring-like members in substantially abutting relation with the inwardly disposed flat end surfaces of the free ends of the looped portions.

References Cited in the file of this patent

UNITED STATES PATENTS

| Number | Name | Date |
|---|---|---|
| Re. 15,387 | Ratzburg | June 13, 1922 |
| 1,054,980 | Morgan | Mar. 4, 1913 |
| 1,131,116 | Chubbuck | Mar. 9, 1915 |
| 1,133,486 | McLaughlin | Mar. 30, 1915 |
| 1,267,544 | Haubner | May 28, 1918 |
| 1,350,484 | Bailey | Aug. 24, 1921 |
| 1,435,551 | Peterson | Nov. 14, 1922 |
| 2,589,207 | Welsh | Mar. 11, 1952 |